Dec. 3, 1963 A. D. MARTIN 3,112,526
EXTRUSION APPARATUS
Filed Sept. 27, 1961
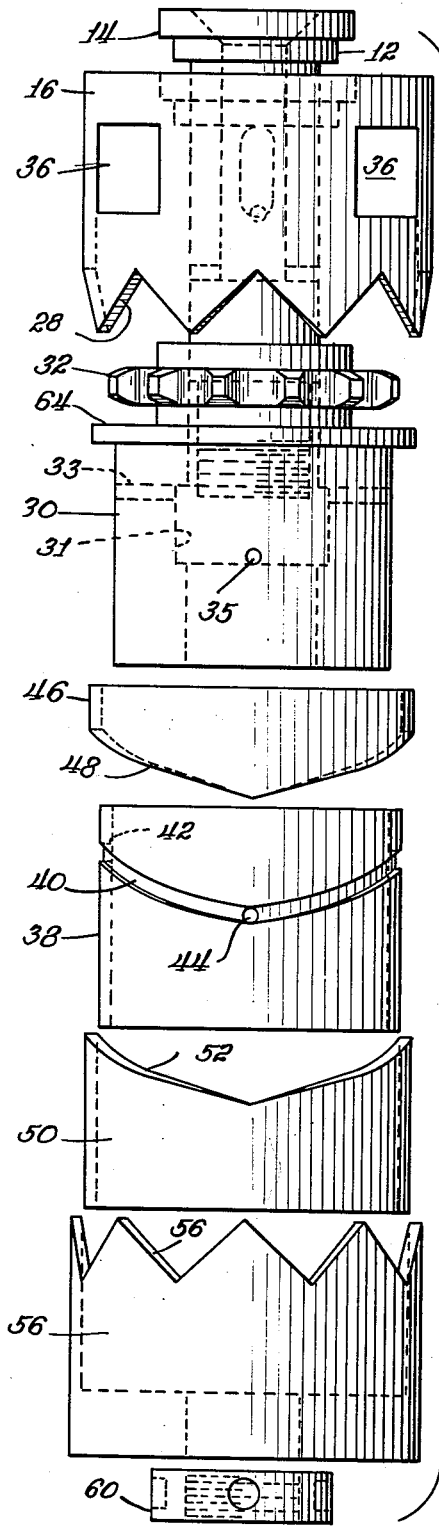
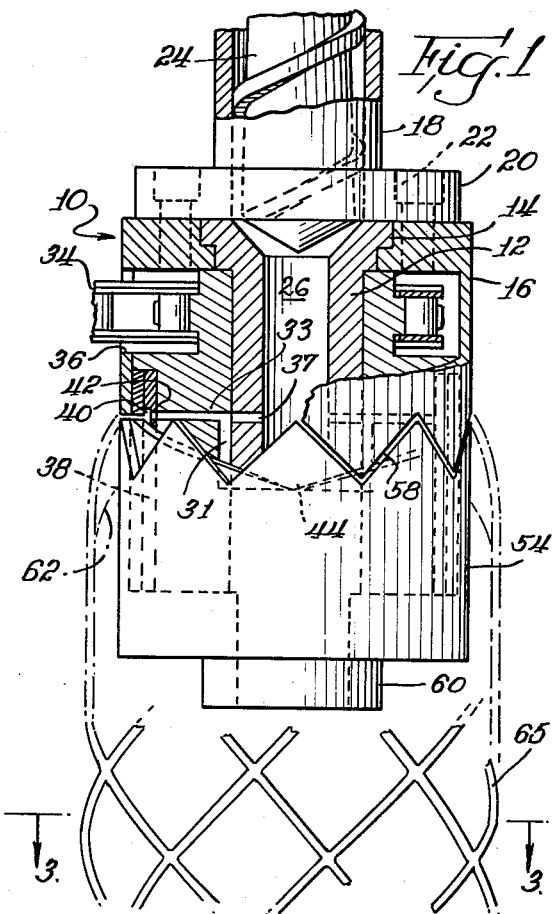
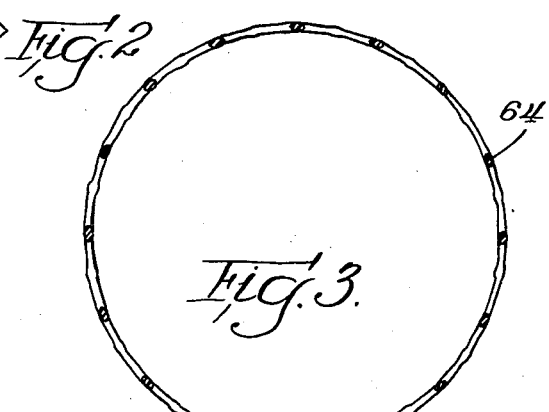
INVENTOR
ALLAN D. MARTIN
BY
ATT'YS United States Patent Office 3,112,526
Patented Dec. 3, 1963

3,112,526
EXTRUSION APPARATUS
Allan D. Martin, Sanford, Mich., assignor to The Dow Chemical Company, Midland, Mich., a corporation of Delaware
Filed Sept. 27, 1961, Ser. No. 141,164
7 Claims. (Cl. 18—12)

This invention relates to an apparatus for the fabrication of a plastic tubular webbing.

Plastic materials, such as normally solid polyolefins, particularly polyethylene, polypropylene, copolymers of ethylene and propylene and the like, polystyrene and nylon, may be most advantageously used in the extrusion apparatus of the invention.

The type of product under consideration is relatively new in the art of plastic extrusion. Reference may be made to U.S. Patent 2,919,467 issued January 5, 1960, to F. C. Mercer, which discloses a method and apparatus for fabrication of plastic net-like structures. While the teaching of the Mercer patent and that of the present disclosure have certain objectives in common, the method, apparatus and product disclosed herein differ significantly from that of the Mercer patent. Considering the product, that produced by the apparatus of Mercer is obtained in effect, by longitudinally splitting or shearing strands of material as they move from an extrusion nozzle. Predetermined lengths of each strand are left unsplit whereby adjoining strands will be interconnected in a manner as to form a net-like structure.

The apparatus of the present invention will form strands having a full, or unsplit diameter. In addition, a multiplicity of webbing patterns may be produced by varying certain factors, such as extrusion nozzle shape and/or certain operating conditions as will be pointed out hereinafter.

In the copending application of Allan D. Martin and Irving S. Houvener, Serial No. 141,163, filed September 27, 1961, a method and apparatus is disclosed for fabrication of a plastic tubular webbing. While the objectives and end product of the apparatus of the copending application and those of the present invention may be similar, there is very little similarity in structural details between the apparatus of the related disclosures.

The main object of this invention is to provide a method and apparatus for producing plastic tubular webbing in a continuous extruding operation.

Another object of the invention is to provide a method and apparatus for producing plastic tubular webbing wherein the pattern of the webbing may be varied.

These and further objects and features of the invention will become more apparent from the following description and accompanying drawing wherein:

FIG. 1 is an assembly view, in partial cross section, of extrusion apparatus embodying the principles of the invention;

FIG. 2 is an exploded view of the extrusion apparatus of FIG. 1; and

FIG. 3 is a section view generally as seen from line 3—3 in FIG. 1.

Referring now to the drawing, numeral 10 identifies an extruder head assembly including a cylindrical arbor 12 having a flange portion 14, on which is affixed a cylindrical inboard web forming nozzle 16. An extruder barrel 18, having a flange 20, is affixed to the nozzle 16, by fastening means such as cap screws 22. The extruder barrel 18 contains an extruder screw 24, the end of which enters a sprue 26 formed in the arbor 12. Plastic material from an extruder (not shown) is thus forced into the sprue 26. The lower end of the nozzle 16 is formed to provide a saw tooth edge 28 extending about the entire periphery. Rotatably mounted upon the arbor 12 is a cylindrical carrier 30 which is enclosed by the nozzle 16 and is in sliding engagement therewith. The carrier 30 has a sprocket 32 engageable by a sprocket chain 34 connected to a motor means (not shown) whereby rotary movement is provided the carrier. A gate in the form of a cylindrical recess 31, is provided on the inner circumference of the carrier. Two pairs of metering orifices 33 and 35, radially extend from the recess 31 through the cylindrical wall of the carrier. Openings 36 are arranged in the wall of the nozzle 16 to provide clearance for the chain 34. Metering orifices 37 are formed in the arbor 12 providing communication between the sprue 26 and the recess 31.

A cylindrical gate bushing 38, affixed to the carrier 30 for rotary movement therewith, has a gate defined by a continuous and symmetrically curved groove 40 formed on the surface thereof. A first pair of metering orifices 42 pass through the gate bushing at diametrical inner end points of the groove 40, while a second pair of metering orifices 44 pass through the gate bushing at diametrical outer end points of the groove 40.

A cylindrical inner moving nozzle 46 is secured to the inner end of the gate bushing 38 for rotary movement therewith, one end of the nozzle 46 having a curved edge 48 adapted to conform with a first edge of the curved groove 40.

A cylindrical outer moving nozzle 50 is secured to the outer end of the gate bushing 38 for rotary movement therewith, one end of the nozzle 50 having a curved edge 52 adapted to conform with a second edge of the curved groove 40.

The bushing 38 is mounted upon the carrier 30 so that the metering orifices 42 and 44 are in alignment with the metering orifices 33 and 35 respectively. In such manner, plastic material forced into the sprue 26, will flow into the gate 40 via the metering orifices 37, recess 31, and orifices 33, 35 and 42, 44 respectively.

A cylindrical outboard web-forming nozzle 54 is affixed to the arbor 12, which nozzle has a saw tooth edge 56, conforming to the saw tooth edge 28 of the inboard nozzle 16. When the nozzles 54 and 16 are in assembled position, the saw tooth edges 56 and 28 respectively, will be arranged in interfitting relation with a uniform space therebetween to provide a zigzag groove 58. The longitudinally projected bounds of groove 58 is substantially equal to that of the gate 40, and when the nozzles 16, 54 and bushing 38 are in assembled relation, the projected bounds of groove 58 and gate 40 are longitudinally coextensive. A spanner nut 60 affixed to the end of the arbor 12, maintains the parts in assembled condition. A web guide form 62, may be supported upon the outboard nozzle 54.

Attention is directed to certain structural details for a better understanding of the assembly 10, namely, the length of the carrier 30 between the side surface of a flange 64 and the end of the carrier (opposite the end supporting the sprocket 32) is substantially equal to the length of the gate bushing 38. Also, the exterior diameters of the inner and outer nozzles 46 and 50 respectively, are such as to provide a sliding fit within the inboard and outboard forming nozzles 16 and 54 respectively, with a minimum of leakage therebetween.

Operation of the extruder head assembly should be apparent, and briefly, is as follows. Plastic material under pressure will be forced into the sprue 26 from the extruder from whence it will flow through the orifices 37 into the recess 31, and into the gate 40 via orifices 33, 35, 42 and 44. As the carrier assembly, comprising the carrier 30, gate bushing 38, and inboard and outboard nozzles 46 and 54 respectively, is rotated, a strand of plastic material will be extruded through each opening developed between the gate 40 and the zig-zag groove 58 to form a helical web-like tube 65. The tube of webbing 65, when started, is pulled over the end of the extruder assembly 10 and over web form guide 62, and may be cooled by water or air spray, or pulled through a water bath, and then may be folded or rolled up as desired. The tube 65 may be split to form a flat sheet prior to roll-up if required.

It should be obvious that the pattern of the webbed tube 65 is determined by the shape of the grooves 40 and 58, as well as the velocity of plastic extrusion and the rotary speed of the carrier assembly. By varying one or more of these factors, webbing of differing designs may be made.

From the foregoing it will be seen that the extrusion apparatus above described will satisfy the objectives set forth hereinbefore.

The foregoing description has been given in detail without thought of limitation since the inventive principles involved are capable of assuming other forms without departing from the spirit of the invention or the scope of the following claims.

What is claimed is:

1. Apparatus for continuously extruding plastic tubular webbing including a cylindrical rotatable means formed to provide a circumferential gate defined by a continuous and symmetrically curved groove formed on the surface thereof, said rotatable means being further formed to provide flow of plastic material to said gate, and nozzle means surrounding said rotatable means and being arranged to effect relative rotation therewith, said nozzle means being formed to provide an irregular shape circumferential groove the longitudinal bounds of which are substantially coextensive with the longitudinal bounds of the curved groove.

2. Apparatus for continuously extruding plastic tubular webbing including, a cylindrical rotatable means formed to provide a circumferential gate defined by a continuous and symmetrically curved groove formed on the surface thereof, said rotatable means being further formed to provide a plurality of metering orifices for flow of plastic material from inside the rotatable means to the curved groove, and a nozzle means surrounding the rotatable means and being arranged to effect relative rotation therewith, said nozzle means having an inboard nozzle and an outboard nozzle the adjacent edges thereof being formed to provide a zig-zag groove having longitudinal bounds coextensive with the longitudinal bounds of said curved groove.

3. Apparatus according to claim 2 wherein said apparatus includes an arbor, a carrier mounted upon the arbor for rotation thereupon, and an inner and outer moving nozzle supported upon the carrier for rotation therewith, the adjacent edges of the moving nozzles being formed to conform with the edges of the curved groove formed on the carrier.

4. Apparatus according to claim 3, wherein said arbor is formed to provide a sprue for receipt of plastic material from an extruder, which sprue is in communication with said metering orifices.

5. Apparatus according to claim 4, wherein said carrier is formed to provide a cylindrical recess on an inner surface, which recess is interposed between metering orifices leading from the sprue and metering orifices leading to the curved groove.

6. Apparatus according to claim 3, wherein a sprocket is provided at one end of the carrier for receipt of a drive chain whereby rotary movement of the carrier is effected.

7. Apparatus according to claim 2, wherein a web guide form is supported upon the outboard nozzle to guide a tubular web extruded from the zig-zag groove.

References Cited in the file of this patent

UNITED STATES PATENTS 2,919,467    Mercer _____ Jan. 5, 1960

FOREIGN PATENTS 1,085,330    Germany _____ July 14, 1960
1,109,131    Germany _____ June 22, 1961